P. C. HEWITT.
HIGH SPEED MOTOR CRAFT.
APPLICATION FILED DEC. 16, 1913.
1,227,784.
Patented May 29, 1917.
5 SHEETS—SHEET 5.
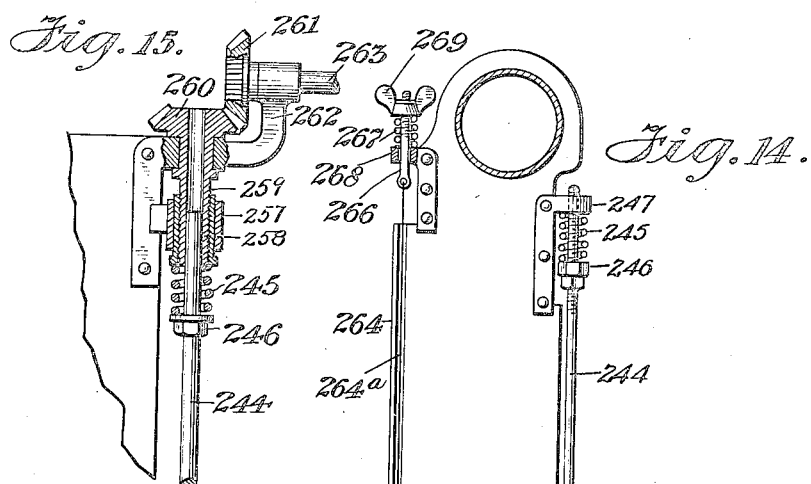
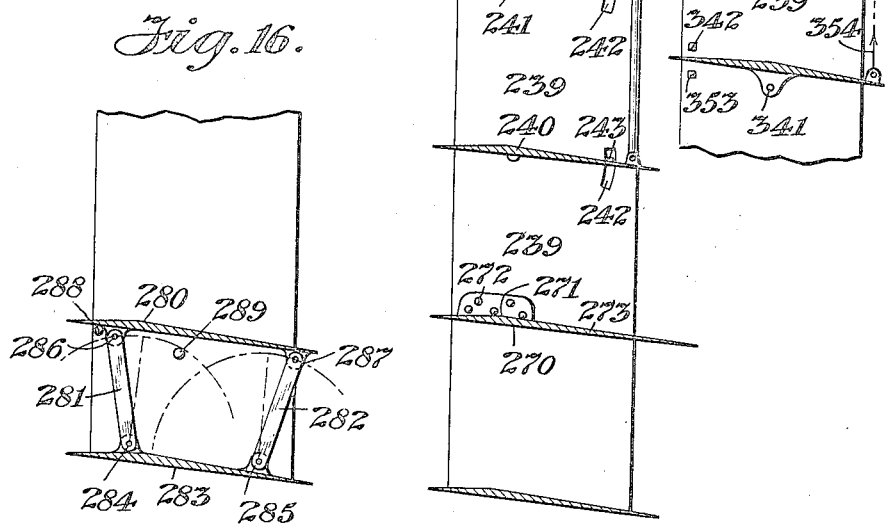
WITNESSES
Chas. F. Clagett
C. W. Fairbanks
INVENTOR
Peter Cooper Hewitt
BY
G. C. ———— ATTORNEY

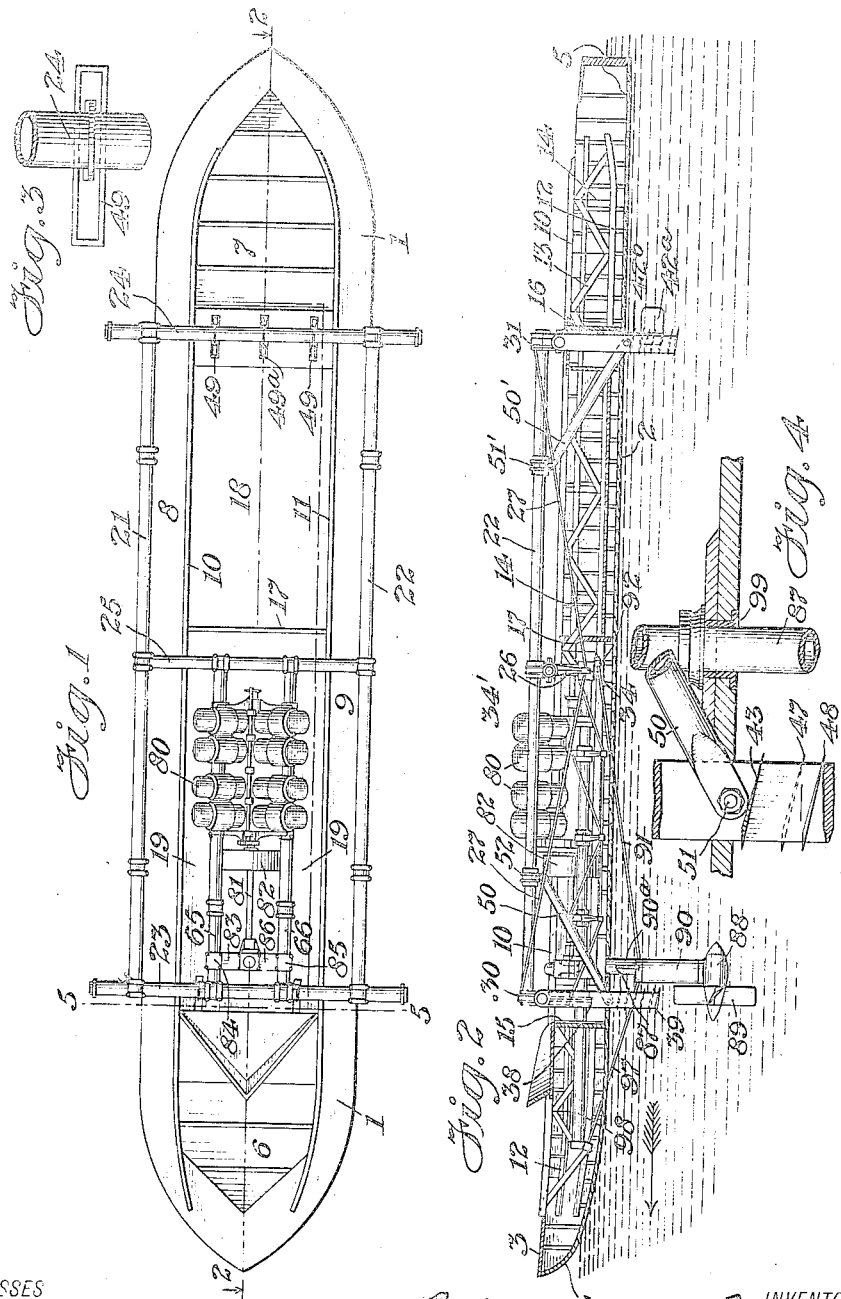

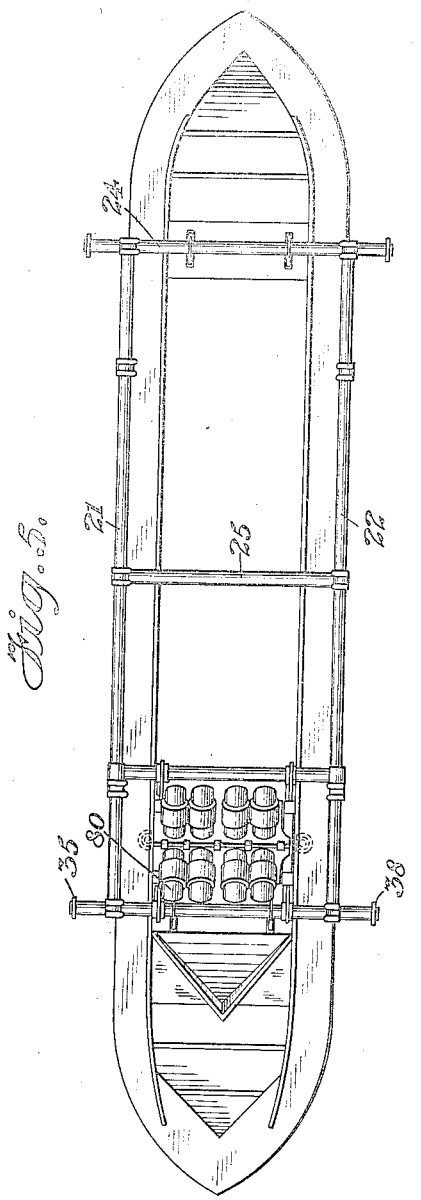

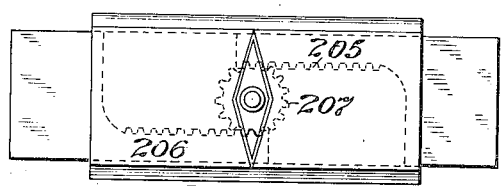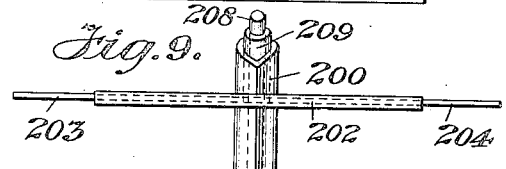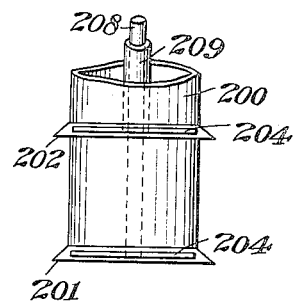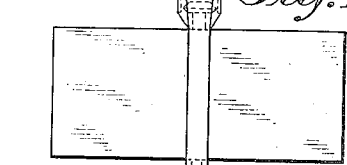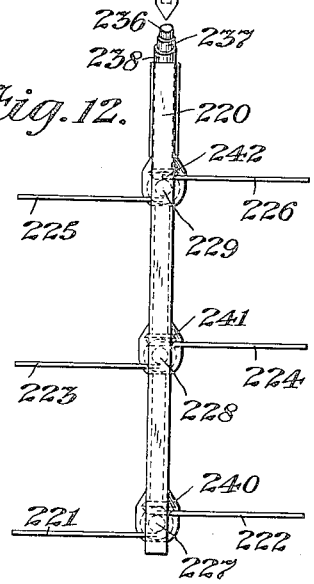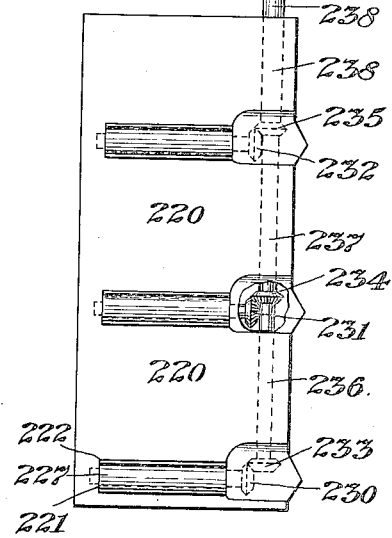

UNITED STATES PATENT OFFICE.

PETER COOPER HEWITT, OF PASSAIC, NEW JERSEY.

HIGH-SPEED MOTOR-CRAFT.

1,227,784.  Specification of Letters Patent.  Patented May 29, 1917.

Original application filed November 12, 1906, Serial No. 343,060. Divided and this application filed December 16, 1913. Serial No. 807,054.

*To all whom it may concern:*

Be it known that I, PETER COOPER HEWITT, a citizen of the United States, and resident of Ringwood Manor, Passaic, in the county of Passaic and State of New Jersey, have invented certain new and useful Improvements in High-Speed Motor-Crafts, of which the following is a specification.

This application is a division of my prior and copending application filed November 12, 1906, and which eventuated in Patent No. 1,084,578 on January 13th, 1914.

My invention relates to motor boats and analogous conveyances for traversing fluid media, particularly those of the class in which the support of the conveyance is afforded by forwardly directed inclined surfaces or plates, which when driven at a predetermined speed, deflect the water downwardly, in sufficient quantities and at sufficient rates to lift the conveyance by upward reaction of the water upon said deflecting surfaces.

In my prior application, Ser. No. 273,724, filed August 11th, 1905, and my prior Patent 1,088,226 issued February 24th, 1914, I have explained the principles of construction and operation of devices of the latter character. While the features herein set forth are especially useful in connection with devices embodying the main principles described in said prior applications, many of them are useful in other relations.

In a high speed craft it is desirable to employ static displacement means to support the craft when at rest or at low speed, and to provide, separate from the static displacement means, a series of gliding surfaces suitably distributed fore and aft and laterally, preferably in accordance with a symmetrical design so as to insure a stable base of support for the craft. The gliding surfaces should be distributed and arranged so that the submerged surface they present in the water may decrease as the speed increases, thus decreasing the wetted area and consequent friction as their lifting power per unit area increases with increased speed. The latter feature results in the operation of the craft with substantially constant lifting effect and tending toward constant resistance, the speed being within limits, approximately directly proportional to the applied power.

The action is explained as follows:

By vertically distributing the deflecting surfaces, so that certain ones or parts may be lifted out of the water, part of said deflecting surface normally traveling above the normal surface of the water and part of them below that level, there is a margin of reserve lifting power to be brought into play, without bringing the hull of the boat in contact with the water. This insures stability, safety and uniformity of action of the device throughout a considerable range of speed and does not involve having the main deflecting surfaces travel on the surface of the water. This same result may be accomplished in other ways hereinafter described.

There are distinct advantages of having most of the weight of the craft supported on plates which are normally submerged at all speeds, and also in having the hull of the boat remain substantially free of the water at all speeds except the slow speeds necessarily attendant upon starting or stopping the craft.

With normally submerged gliding surfaces furnishing the main support, the operation of the craft is more stable,—because such support, is based upon the comparatively uniform solid body of water found below the region of surface disturbances. I have found that submerged deflecting surfaces, especially if downwardly inclined on top as well as underneath, are more efficient for another reason, which I have not before specifically explained; namely, because the column of water above the plate is pulled down in a manner analogous to that in which the column below the plate is driven down. Within limits the amount and rate of downward displacement of the column of water above the inclined plate, will depend upon the static head. In other words, the deeper the plate is, the more effective will be the supporting action due to the downward displacement of the superincumbent column of water.

The area of supplemental deflecting surface necessary to guide and steady the main deflecting surfaces at a desired depth beneath the normal level of the water, is comparatively small at high speeds, and the bottom of the boat is not well adapted for use as such supplementary deflecting surface. This is because the hull of the boat offers to the water a relatively enormous area of comparatively flat surface which, if it contacts with the water at any one point, will in practice necessarily contact over a large adjacent area. Consequently, unless a comparatively undesirable compromise construction is employed, the hull of the craft either will not contact with the water at all and will furnish no supplemental steadying and guiding effect, or else it will contact over too great an area, and thereby suddenly bring into operation an enormous frictional retarding effect. Moreover, the hull is not well adapted for securing a suitable angle of deflecting surface. I therefore prefer to arrange separate supplemental gliding surfaces, preferably at different levels, suitably distributed, and of such small area and angle as will furnish the supplemental support necessary through the range of speeds at which it is desired to operate. With such an arrangement, the hull may occasionally contact with the tops of exceptionally high waves, and thus be occasionally subject to more or less frictional resistance, but this is far less serious than in any arrangement whereby the hull of the boat may approach the normal level of the water and thereby come in contact with the same over large areas.

It is desirable to apply the power of the boat forward of the center of resistance so as to pull, rather than push, the craft through the water. It is also desirable to arrange the propeller to act substantially parallel with the direction of movement of the boat and to have all of the deflecting surfaces arranged to deflect the water so as to give the resultant in lift, with as little lateral displacement or wedging effect as possible, though lateral wedging surfaces may sometimes be used particularly at or near the surface of the water to guard against diving or careening. When so used they may be brought into effect automatically by the diving or careening movement of the boat, either by automatic gravity controlled adjusting mechanism or by being so located as to be moved into contact with the water by the diving or careening movement of the craft.

In the operation of such a device, there are various retarding effects to be overcome by the power applied to the propeller. The resistances of the various wetted surfaces increase as the square of the speed, and the power necessary to overcome them increases substantially with the cube of the speed; but when the design is in accordance with my invention, the resistance is more nearly a constant and all increase of applied horsepower tends to give approximately direct proportional increase in the speed. In operation at normal high speed, the hull is lifted above the normal level of the water, and the deflecting plates lift out of the water one after the other as the speed increases, and approximately as the square of the speed, so that, considering the total effect of these surfaces, I find that though the resistance of those remaining in contact with the water increases as the square of the speed, yet the total area of such surfaces thus in contact decreases with the square of the speed, leaving the total frictional resistance of the supporting plates tending to be constant.

The supports for the propeller and for the gliding plates may lift out of the water practically directly as the speed and their frictional resistance increases with the speed. The propeller itself remains normally submerged and its frictional resistance increased with the speed, as is well known. Thus, there is a small fraction of the entire area of the craft which may not be made to decrease its wetted area with the speed, and for this reason the speed of the craft does not vary in mathematically exact, direct proportion to the horse power applied, but for most practical purposes, it may be considered that the total retarding effect or friction of the wetted surfaces may be made approximately proportional to speed, so that the speed is approximately proportional to the horse-power applied, instead of to the cubic root of the horse power applied.

When the deflecting surfaces are not arranged in such manner as to cause decrease of wetted area approximately proportional to the square of the speed attained, the speed will be necessarily less and for constant wetted area, will be substantially proportional to the square root of the horse-power applied, even where the active hull is supported above the surface of the water. The latter arrangement is, of course, a great improvement over the common arrangement for static displacement by a hull, for in the latter, the speed increases only as the cube root of the horse-power applied. I consider my principle of automatically decreasing wetted area, to be all important for economically attaining extreme high speeds, and this feature of my invention constitutes a great improvement in the art of utilizing the dynamic support of deflecting surfaces, in place of the static support of a displacement body.

The air resistance varies as the square of the speed, and the power required to overcome it, as the cube of the speed, but by reason of the low co-efficient of friction of air, this resistance becomes an appreciable factor only at extreme high speed. It seems to depend to a considerable extent upon the shape and cross-section of the displacement body and may be decreased by forming the craft so as not to force ahead of it or to drag with it a large body of adjacent air.

In the form of the apparatus disclosed herein, for the purpose of illustrating and practising my invention, the flotation body is a single, wide, shallow hull, with a flat deck and normally low freeboard, with little or no outside keel. Such a hull is well adapted to ride upon the water with small displacement at low speed; when lifted out of the water at high speeds, its surface leaves the water progressively and when traveling through the air, it has minimum air resistance, and exposes only a comparatively small lateral area to winds abeam or quartering.

The hull is effectively braced and stiffened fore and aft by light trusses, extending the entire length of the boat, and preferably arranged on each side of the inner edge of the wash-boards.

The strength of such a hull may be availed of to sustain and distribute the motive and gliding stresses, but I prefer to have the gliding surfaces for downwardly deflecting the water and the motor for propelling the craft mounted on a separate, rigid frame, preferably of trussed tubing. The engine is carried below the level of this frame within the body of the hull on a supplemental frame suspended from the main frame and is connected with a deeply submerged propeller by right angle power transmitting devices including suitable transmission shafts and bevel gears.

The construction of the parts is such that all stresses due to the forward pull of the propeller, rearward drag of the planes, and torque and vibration of the motor take effect upon the trussed frame, so that the power outfit and gliding support outfit are parts of one integral, self-contained structure. This structure is secured to the hull, which is itself a separate, self-contained structure, so that when traveling at normal high speed on the gliding planes, the hull is merely a load carried by the trussed frame, and is not required to support any of the weight of the motive power outfit. For this reason, the hull may be of light construction, and yet be strong enough for the purpose of flotation when at rest and at low speeds.

There are other advantages in the unitary truss structure arranged as described. One is that the speed of a gliding plate structure is in no way dependent upon extremes of great length and narrow beam, as in the case of a hull. The gliding plane structure may, therefore, be only as long as is necessary to get a desirable length of base of support, and may be widened out as much as desired for the purpose of stability. The truss frame, even when constructed of good quality drawn steel tubes, adds materially to the weight of the craft, and I found it practicable to save weight by making this structure approximately one-half the length of the hull, the length being determined by the amount of permissible vertical lift of the craft under the gliding plane support. I prefer to make the ratio of these two dimensions such that the one set of gliding planes may be in the extreme position, when the lowermost plane of that set travels on the surface of the water, while the other set of gliding planes is in the other extreme of position, where the uppermost gliding plane, or even the adjacent hull of the boat is about to come into contact with the surface of the water, and yet even in such extreme position of permissible pitch, the gliding plates are not inclined downwardly, so as to produce a diving or submerging effect. Thus, if the normal inclination of plates is 8 to 1, the permissible pitch, i. e., the ratio of the length of truss to vertical lift, will be more than 8 to 1.

The projection of the bow of the hull beyond the forward set of gliding planes, affords a safety factor available for emergencies, insomuch as development of any excessive pitching movement brings the bow to the water level, where its great surface operates dynamically as well as statically, to correct the diving tendency.

There may be one or more propellers, and the crank shaft may be arranged either fore and aft or transversely. In the latter case, twin screws may be employed, geared to each end of the crank shaft. Such a combination of transverse motor shaft with twin propellers, is especially desirable because the torque of the motor shaft is directed fore and aft instead of abeam, and with the two propellers rotated in opposite directions, there is no tendency to cause the craft to list or tilt laterally at high speeds. The length of the structure being great as compared with the beam, the effect of the torque in the former direction is far less objectionable than in the latter, and can be counterbalanced, if necessary, with less inconvenience than is involved in counterbalancing the same twisting or tilting power when applied across the boat in the direction of the narrow dimension of the base of support, and the torque may be used to tend to counterbalance the squatting tendency of the craft. There is a further advantage in twin propellers because they may be located at a suitable distance from each other so as to have a certain percentage of increased efficiency due to a displacement rearwardly of the column of water lying between them by the mere movement of the two adjacent parallel columns from the two propellers. This additional rearward displacement is effected without any increase of wetted area of the propellers, and is, therefore, a net gain not involving any corresponding increase in friction of propeller surfaces. The proper distance of separation of the propellers depends on the cross section and velocity of the two parallel columns of water, rearwardly displaced thereby.

The propellers, whether single screw or twin screw, are preferably true screw propellers adapted to be driven at high speed and to displace the water rearwardly at equal speeds through all the cross-sectional area of the column displaced. In practice, I prefer to make the blade of a pitch greater than one to one and of an area about as shown in the drawing.

They are preferably deeply submerged in the water and preferably act horizontally in the direction of movement, rather than at an inclination; the supports should have small wetted area and should be of such design as to offer as little resistance to the water as possible. At the same time, they must be light and of great strength, adapted to transmit great power with small frictional losses.

The gliding surfaces may be formed and arranged to decrease the wetted area without lifting out of the water, either by folding against the sides of the supports, or by sliding telescopically one into the other, or in any other desired way.

The method of applying the motive power to drive the craft must be such as to meet certain characteristic conditions of varying frictional resistance. The applied power must equal the frictional resistance of the supporting hull, plus the resistance of the planes, for all speeds below those at which the lifting power of the planes is sufficient to lift the structure. This is a maximum when the speed has been increased to a point not quite sufficient to cause the planes to lift the hull out of the water. Upon increasing the speed a little more to a point where the supporting power of the planes is sufficient to lift the hull, the hull resistance will be removed and less power will be required for forward movement at that higher speed with the hull out of the water than at a lower speed with the hull in the water.

It is not generally practicable to devise a fixed pitch and area of propeller, and a fixed ratio of gearing of the latter to the motor, that will be suitable for best operation throughout this critical range of high and suddenly changing resistance. At the time when the hull is about to leave the water, the motor should be able to give a large amount of its power, and it must therefore be arranged to revolve at the speed of maximum power development. In order to attain this high rate of revolution during the period of relative low speed and high resistance of the craft, the pitch of the propeller or the ratio of power transmission from the motor shaft must be capable of variation. For this purpose a speed changing gear box, or a propeller having feathering blades, may be employed. If desired, the design may be such that the motor will normally revolve at its rate of maximum power development during the critical period of low speed high resistance, when directly connected with the propeller. In such case, a speed increasing gearing or equivalent adjustment of the propeller will be necessary for the higher speeds, after the hull has been lifted out of the water by the gliding planes.

I prefer however, to arrange the pitch of the screw and the design of the transmitting gear so that a speed reducing gear, or its equivalent, is necessary in order to permit the motor to turn over at its rate of maximum power development during the critical period of low speed, high resistance, the direct connection being thrown in for the normal high speed, low resistance operation, when the hull has been lifted out of the water and the entire weight of the structure is sustained by the gliding planes.

By this method of operation, the motor of the gliding craft is enabled to attain its full power development during comparatively low speed operation of the craft characterized by a high resistance ratio, and also to attain its full power development at another higher speed of the craft characterized by a lower resistance ratio.

Referring to the drawings:

Figure 1 is a plan view of a boat equipped with gliding planes, in accordance with my invention.

Fig. 2 is a longitudinal section of the hull on the line 2, 2, showing the supporting planes, propeller, motor, and frame support therefor in side elevation.

Figs. 3 and 4 are details of parts shown in Fig. 2, to be referred to hereinafter.

Figs. 5, 6 and 7 are respectively top plan, transverse section, and longitudinal section of a modification wherein the motor is set transversely and twin screws are employed.

Figure 6:
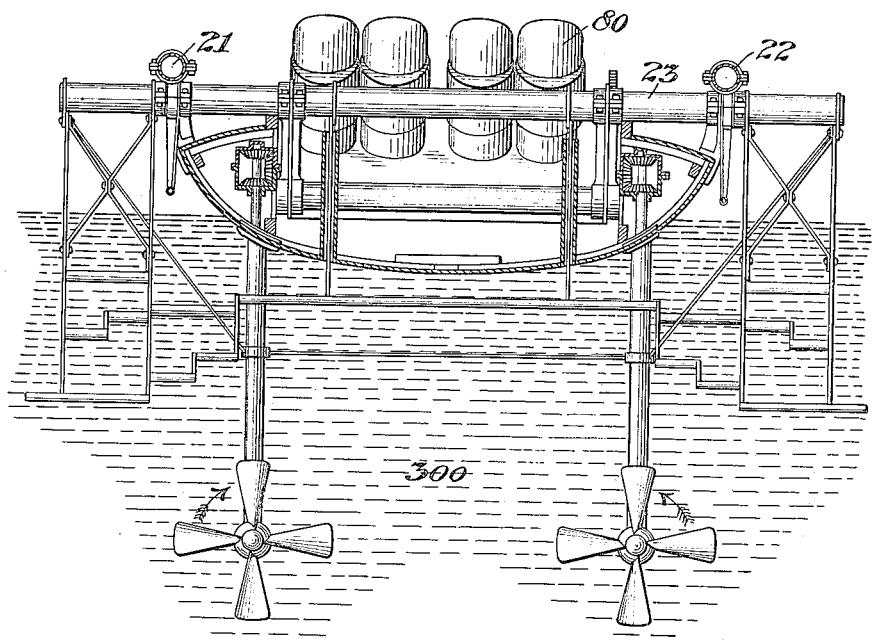

Figs. 8 to 17 inclusive are detail views of various forms of adjustable gliding plates and mechanism for use in connection therewith.

I will now describe with considerable exactness and detail concrete forms of apparatus for the practice of my invention, as illustrated in said drawings; but it will be understood that the invention is broad, and is not limited to such precise details of construction and that the claims hereinafter presented are not to be considered as limited to any particular form or feature not specifically set forth therein.

In the drawings, I have shown the invention in connection with a single hull 1, which is preferably long and shallow, being formed with a comparatively wide, rounded or V-shaped bottom 2, flat deck 3, spoon bow 4, and sharply tapered flat bottom stern 5. The extreme beam at the deck is rather large for a high speed hull, but the lines are such as to give a materially narrower beam at the water line. The skin of the hull is preferably smooth. It is covered in fore and aft by decks 6 and 7, and laterally by washboards 8 and 9. The combings 10 and 11 are utilized as the upper members of longitudinal trusses, which extend the entire length of the boat, and comprise the lower members 12, diagonal thrust members 13, and tension members 14. The portions decked over fore and aft at 6 and 7 are closed in by water tight bulkheads 15 and 16, and there is an intermediate transverse water tight partition at 17. The cock-pit 18 is utilized for passengers or load, and the forward compartment 19 is occupied by the motor power outfit. Such a hull combines lightness with great strength, and is well adapted to ride over the water with small displacement at low speeds, and when lifted out of the water at high speeds, it offers minimum surface for windage and air resistance.

The frame for carrying the motor and transmitting and properly distributing the stresses of propeller, gliding planes and motor, is a unitary structure consisting of rigidly secured thrust members and suitably arranged tension members, adapted to stay and stiffen the latter. The frame comprises the longitudinal members 21 and 22 and the transverse members 23 and 24 at each end, together with the transverse member 25, intermediate the ends. The members comprising this main frame, are preferably integral lengths of drawn steel tubing of ample size, and they are secured together preferably by frictional engagement without screw threading or otherwise weakening the material of the tubes.

The longitudinal members 21 and 22 are stayed and made rigid by means of thrust members 26, extending at right angles thereto a suitable distance and engaging tension members 27, 27, extending preferably from one end of the tube to the other and engaging said thrust members 26. The tension members 27, 27 are preferably fine quality steel wire of great tensile strength as are also the other tension members hereinafter mentioned. By use of a plurality of such wires arranged parallel with each other and preferably separately secured at the ends, it is possible to secure almost any desired strength of tension member without materially increasing the total weight of the structure. The tension members 27, 27 may consist of separate lengths of the wire, each independently secured by nuts 30, 31 at opposite ends of the longitudinal frame members 21 and 22 and by other nuts 33 at the end of the thrust member 26, as indicated in Fig. 6; but I prefer the arrangement indicated at 34, in Fig. 2, where 27 is a single unbroken length of wire, extending from 30 to 31 and passing over a saddle 34 at the end of the thrust member 26.

On the ends of the transverse frame member 23 are pivotally mounted two pairs of supports 35, 36 and 37, 38, to which are secured the forward set of gliding plates. As will be seen from Fig. 3, the supports and gliding plates carried thereby are preferably symmetrically arranged with respect to the longitudinal vertical central plane of the craft. The pair of gliding plane supports 35 and 36 are stayed by diagonal braces 37', 37', formed from strips bolted together at 38' and secured substantially as shown. To each pair of supports are secured the lowermost main gliding plates 39, 39. Above these are the vertically distributed gliding plates 40, 40 and 41, 41, each plate 40 being connected with plate 41 by a vertical portion 42. These gliding plates and the intermediate vertical portion are formed integrally from a single piece of steel about ¼ inch thickness, sharpened at the forward edge and tapering rearwardly, as indicated in the drawings.

Above these, at a level higher than any of the other gliding surfaces and not much below the level of the bottom surface of the hull are the supplemental gliding plates 43, 43. These are the outermost and uppermost gliding surfaces, and when the craft is traveling at normally high speed, their function is mainly that of guard planes to take effect upon the surface upon tendency to tilt, and thereby correct such tendency.

Between the two pairs of supports 35, 36 and 37, 38 and secured to 36 and 37, are gliding surfaces 44, 44 and 45, 45, connected by integral vertical portions 46, 46. At their inner ends, or ends nearest the center of the hull, the plates 45 are provided with vertical, integral extensions 46', 46', which are in turn secured to or formed integrally with a single transverse plate 47, extending across the boat at a level only slightly lower than that of the supplemental gliding plates 43. The plate 47 is intended for use at low speeds as one of the main supporting surfaces, but at high speeds it is designed to be out of the water, so that its function is mainly that of a supplemental gliding plate to furnish a reserve of lifting power by coming into contact with the water when needed.

Other gliding plates 48, 48 are secured to the vertically extending portion 46' and to the adjacent supports 36, 37 respectively.

These plates and supports are all preferably formed of the ¼ inch steel previously mentioned, bent to shape and secured by bolts or rivets. All adjacent opposing surfaces of the vertical extending members, are preferably flat on the sides adjacent each other and rounded off on the sides more remote from each other, so that the forward and rearward edges are sharp and adapted to slit the water. All vertical surfaces are as nearly as possible parallel with each other and with the direction of movement of the boat. The gliding plates are preferably plane faced beneath, the thickening being worked into rear or upper face.

The long transverse plate 47 is preferably braced by supports rotatably mounted on the transverse frame member 23 and extending through wells 49, 49, opening through the bottom of the boat and extending above the water line.

As has been stated, the distribution of gliding surfaces on each side of the boat is preferably symmetrical, and the vertical distribution is such that there are always gliding plates near the level of the water both above and below the same, adapted to be raised above or decreased below the same, to go into or out of action successively, as may be needed. By reference to Fig. 6, it will be seen that as the boat is speeded up, the plates will come out of the water in the following order: 43, 47, 48, 41, 40 and 45. Thus, at the extreme high speed, the lowermost plate 39 may be the only one normally submerged, and in such case the next higher plate 44 may perform the function of a supplemental gliding plate adapted to furnish the auxiliary support necessary to maintain the proper level of the structure and submergence of the lowermost plate 39. At a slightly lower speed 44 becomes normally submerged and 45 adapted to travel at or near the surface, above or below the same, and to act as a supplemental gliding plate. At a still lower speed, 45 is normally submerged and plate 40 is at or near the surface. When the speed is decreased to such an extent that plate 41 is at or near the surface, the relatively great lifting effect of the long gliding plate 47, with its preferable steeper angle, is available and will come into play in any emergency or upon further decrease of speed.

When the boat is traveling at the high speeds first above described, with only plates 39 and 44 normally active, all of the remaining plates then above the water are in position to come into operation with their active lifting effect at any time whenever movement of the water or shifting of the load in the boat causes submergence of such plates below the water. When these conditions occur, the plates come into action one after the other without any great shock, such as would be caused by bringing a large supporting area into action suddenly instead of gradually. If the added effects of the smaller supplemental surfaces, thrown in one after the other, are insufficient to effect the desired correction of level of travel of the craft, the emergency will be such that all of the effect of the relatively great area of plate 47 will be necessary, this being practically the last reserve lifting instrumentality before contact with the water of the relatively enormous bow surface. The supporting plates 43 are so nearly on the level of the hull as to be practically unavailable for correcting a diving tendency, before contact of the bow with the water. They are, however, located well outboard laterally so that they come into contact with the water and will correct rolling tendency, in advance of any possible submergence of the lateral surface of the hull.

The pivoted structure constituting the forward set of gliding supports is braced by diagonal thrust members 50, pivoted to the supports 36 and 37 at 51, and secured in any desired position of adjustment by clamping members 52, encircling the longitudinal frame members 21 and 22.

The rear set of gliding supports is preferably like the forward set, being similarly pivotally supported on the transverse frame member 24 and secured in desired adjustment by braces 50', 50' and clamps 51', 51'.

By the above described arrangement, all rearward as well as upward thrust on the gliding plates takes effect upon and is distributed through the trussed frame, instead of taking effect directly on the hull.

As has been previously stated, torque and vibration of the motor, as well as pull of the propeller, are transmitted to this same frame. To this end the motor is mounted upon a supplemental drop frame amply stayed and trussed and located within the hull cavity, but preferably and directly connected therewith. The supplemental frame comprises hangers 60, 61 depending upon the transverse frame member 23 and secured thereto by clamps 62, 63, encircling same. Similar hangers are secured to the intermediate transverse member 25 by similar clamps. These hangers are castings provided with suitable strengthening ribs, as shown, and each adjacent pair of hangers has cast integrally therewith a transverse member. The hangers have formed therein split ring passages adapted to be clamped about the longitudinal tubes 65, 66, which form the bed of the engine. These tubes are provided with laterally extending thrust members, which are parts of a truss structure completed by the symmetrically disposed tension members 67 and 68, 69 and 70, 71 and 72. These tension members may be separate lengths of steel wire secured by nuts to each of the lateral thrust members, or they may consist of two continuous lengths of such wire secured at each end by nuts, and merely fitting in saddles in the end of the thrust members as indicated in Fig. 2. In such case 71, 69, 70, 72, may be a single length of wire integral from end to end.

The motor 80 is preferably an eight cylinder motor having four cylinders on a side, disposed at an angle of ninety degrees from each other, and preferably of light construction. I have constructed such a motor of such a design that at a weight of five hundred pounds it will develop more than one hundred horse-power.

The bed plate of the motor is formed with clamps fitting the tubes 65, 66 of the supplemental drop frame previously described, the latter constituting the bed plate of the engine. It will be understood that the efficiency of the gliding planes is such that a boat of the proportions shown will be operative if equipped with any light engine of similar horse-power, even though it weigh considerably more than five hundred pounds.

The crank shaft 81 is extended forwardly to a point near the plane of the forward set of gliding plates, where it connects with the transmission gear extending vertically downward to the propeller. The connection of the shaft 81 to the motor is preferably through a combined change speed mechanism and clutch 82, which may be of any known or desired type.

The transmission gear is supported in a saddle 83, consisting of a casting provided at the ends with clamps 84 and 85, encircling the longitudinal frame members 65 and 66. The upper gearing is located in a central chamber 86 from which extends the tube 87, inclosing the vertical power transmitting shafts. The tube 87 terminates in a lower gear chamber 88, which also serves the function of journal for the propeller 89. For a portion of its length the tube 87 is provided with a case 90, but is extended and sharpened fore and aft so as to cleave the water with as little resistance as possible. The casing referred to begins at a point below the bottom of the hull, which is designed to be near the water level when the craft is at normal high speed and supported upon the guiding surfaces. This propeller support and power transmitting projection is stayed against the pull of the propeller by a rearwardly extending tension member 91, which passes through the bottom of the boat, preferably through a yielding water tight packing, so as not to positively engage the hull, and is secured by a screw nut to the rear end of the supplemental engine frame, as at 92. The propeller support is stayed laterally by tension members 93, 94, extending outside the hull and adjustably secured at 95, 96. If desired the propeller may be stayed in a forward direction by tension member 97 extending through the hull and engaging tubular projection 98 of the motor frame. The vertical tube containing the propeller shafts may be surrounded by suitable water tight packing 99 at the point where it passes through the skin of the hull. The packing at this point may also be elastic so as to permit slight yielding action and vibration without too great stress upon the hull.

The proportion and relative arrangement of the parts is preferably such that the propeller acts substantially in the vertical transverse plane of the forward set of gliding plates. In accordance with this part of my invention, the propeller is preferably arranged in front of its support to pull the load through the water, rather than to push it. I find that the propeller may be designed on more nearly correct mathematical principles, fully explained in my prior application, if the water flows into the propeller from a solid substantially undisturbed mass, and this requires that there be no supports in front of the propeller to break up the flow of water thereunto. The disturbance of the rearwardly displaced column of water at the support in the rear thereof, is of much less importance. It represents a certain amount of dead loss of power, to be sure, but it does not interfere functionally with the flow of water to the propeller surfaces. The propeller hub is tapered to a conical point forwardly, and the gear chamber is similarly tapered to a point rearwardly.

Figure 7:
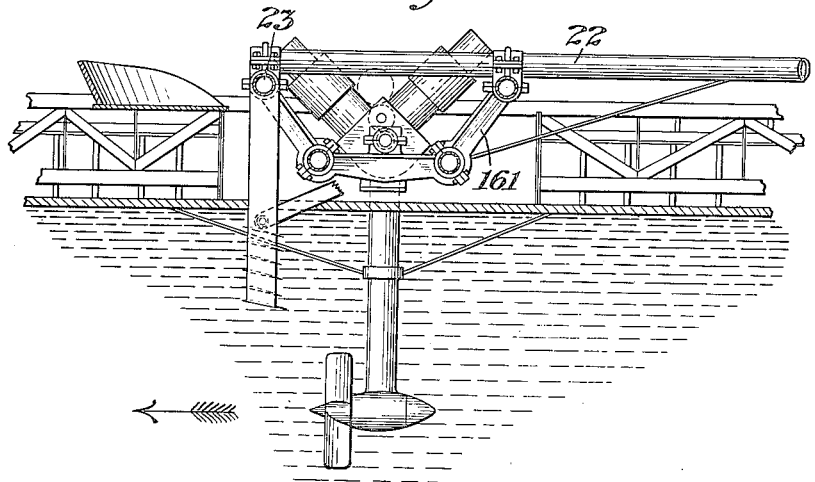

In Figs. 5, 6, and 7 of the drawings, I have shown an arrangement of twin propellers with a transversely disposed motor, which possesses peculiar, novel, and advantageous features.

In said figures the hull of the boat, the main truss frame for supporting the motor, the gliding supports, the propeller supports, etc., are substantially the same as in the preceding figures. The motor may be of the same construction as that previously referred to.

Referring now more particularly to the differences of construction, it will be seen that I arrange a supplemental transverse frame member adjacent the forward frame member 23, and separated therefrom by a distance sufficient to accommodate the width of the motor. Hangers of slightly modified form, but similar to those previously described, are hung from these transverse members 23 and having between them a transverse connecting member, preferably cast integrally therewith, and preferably provided with clamping recesses, in which recesses are the transverse tubes which serve as the support or bed plate of the engine, thus serving substantially the same function as the tubes 65 and 66 previously described. At each end of the crank shaft of the motor are duplicate gear boxes, preferably similar to the gear box 86 previously described. Within this box and mounted on the crank shaft are beveled gears engaging similar mating gears mounted respectively on the inner and outer twin shafts for transmitting the power to the propellers. The lower gear boxes and the propeller supports and the propellers are preferably similar to those previously described, except that they are constructed on a smaller scale, since the two propellers are required to give an effective pull, approximately the same as the single propeller first described.

A special advantage of this arrangement is that the torque of the crank shaft takes effect fore and aft, instead of laterally, so that changes of equilibrium due to this torque effect, operates only to change to a slight extent the lengthwise trim of the craft, and there is no lateral tilting effect. The two propellers rotate in opposite directions, and their lateral tilting effects are exactly counterbalanced one by the other. This arrangement is free from any and all dynamic effects tending to disturb the lateral trim of the boat when at rest and when under way. This is a great advantage, because the total dynamic tilting effect which may be produced with the single screw arrangement first described, may be great enough to cause considerable inconvenience in the operation of the craft. It is possible to compensate for it in various ways, as, for instance, by arranging ballast on one side, to be counterbalanced by the weight of the operator on the other side while the craft is at rest. Upon driving the craft at speed, the operator may change his position so as to be on the same side of the craft with the ballast, thereby subtracting his weight from one side and adding it to the other. This is a practical expedient in a small boat, but it is easily seen that it is disadvantageous, in so much as it limits freedom of movement desirable in attending to the operation of the craft. It is also possible to arrange supplemental gliding surfaces to furnish an added lifting effect on the downward side of the boat when proceeding at high speeds, where this effect becomes noticeable. These expedients are all more or less inconvenient, and are not to be compared with the transverse motor and twin screw arrangement whereby all tilting tendency varying with the speed, is entirely eliminated. The twin screw arrangement is advantageous also on account of the efficiency due to the displacement of the column of water in the region indicated at 300. This region is bounded on two sides by the columns of water displaced rearwardly by two propellers, and the body of water therein is dragged along with said column in an economical manner, because the displacement is at a low rate and is effected without any increase of frictional area of the propeller surfaces.

Other parts of the apparatus are capable of variation, and some of the possible variations are indicated in Figs. 8, 9, 10, 11, 12 and 13 wherein I have shown various forms of adjustable gliding surfaces.

In Figs. 8, 9 and 10 I have shown gliding surfaces having a certain fixed area and a certain supplemental adjustable area, which is capable of increase or decrease to meet the conditions.

In these figures the gliding surfaces are supported and held by a single thrust member 200, extending downwardly from a suitable point of connection to the main truss frame of the craft. This support is narrow laterally and elongated fore and aft, to minimize its resistance to movement through the water. On said support are a plurality of gliding surfaces 201 and 202 of fixed area. Operatively related to these are the supplemental gliding surfaces 203 and 204. These are adapted to be moved in and out on suitable slide ways formed in the fixed plates 201, 202. To effect such movement they are formed with inward extensions 205, 206, symmetrically disposed in said cavity, said extensions being provided with rack teeth on their adjacent edges, in operative relation to a pinion 207, adapted to be rotated by a shaft extending down through the support 200. The pinion for the support 201 is operated by the inner shaft 208, and the pinion operating the next higher set, is rotated by the shaft 209, concentric with shaft 208. These shafts may extend above the water and may be operated manually or automatically through any known or desired controlling means.

These arrangements serve to increase and decrease the active lifting surface, and the change of wetted area is in exact proportion to the change of effective lifting area, because when housed within the members 201 and 202, the extensions 203, 204 are not in frictional engagement with the water, and neither retard or lift the craft.

In Figs. 11, 12 and 13 I have shown another adjustable arrangement, whereby the effective lifting area may be varied without causing the plate to be lifted out of the water. By this construction the support 220 is of the same width fore and aft as the gliding surface supported thereby. As shown in the drawings, there are three adjustable units at different levels. Each consists of two plates 221, 222 and 223, 224 and 225, 226, each pair of plates being mounted upon a horizontal shaft after the manner shown in the drawing. When in open position, the plate 221 extends tangentially from the bottom of shaft 227 and plate 222 tangentially in the opposite direction from the top of said shaft. The arrangement is such that when the shaft 227 is rotated, the plate 221 moves upwardly through the arc of the circle to the vertical position, and is housed against the side of the support 220. The other pairs of plates 223, 224, and 225, 226 are similarly tangentially mounted upon shafts 228, 229 respectively, and fold against the sides of the support in the manner just described with reference to plates 221 and 222.

In order that these oppositely extending pairs of plates may be secured in the folded or open position, or in any desired intermediate position, the shafts 227, 228 and 229 are provided with bevel gears 230, 231 and 232 respectively, and mate with gears 233, 234 and 235 respectively, said latter gears being arranged respectively on concentric tubular shafts 236, 237 and 238. These shafts and gears are housed within an enlargement 239, formed along the forward edge of the support 220. The housing is slightly enlarged at 240, 241, and 242 in order to accommodate the beveled gears referred to.

The shafts 236, 237, and 238 may extend above the water and may be operated either by hand or automatically by any known or desired means, as in the case of Figs. 8, 9, and 10. The possibilities of operation of the arrangement shown in Figs. 11, 12, and 13 are somewhat more varied than in the preceding case. When in use the support 220 will be inclined forwardly so as to present the under sides of the plates to the water at an angle, for the purpose of deflecting the same downwardly. The supports are in such position that the movement of the plates about their axes 227, 228, and 229 to an intermediate position between the horizontal and the vertical, will serve to produce a deflection of the water more or less lateral, according to the angle to which they are adjusted. For this reason it is possible to use these plates as laterally deflecting surfaces, if desired. For instance, the two lowermost pairs of plates may be employed in fully extended position, where they deflect the water directly downward, while the upper pair 225 and 226 may be set at an angle to deflect the water laterally as well as downwardly from the side of the boat at which they are secured. As this pair of plates is at a much higher level and may be closer to the water level and slightly above the same, they would, when so adjusted at an angle, serve as lateral wedging surfaces to correct tendency to lateral tilting or careening, which might be caused by the exigencies of operation in a sea way with a live load of passengers or operators.

In Figs. 14, 15 and 16, I have shown automatically feathering gliding plates, which may be designed and adjusted to produce a substantially constant lifting effect at all speeds. These plates may be mounted in a pair of supports like 38 and 39, first above described. I have shown one support, 239, adapted to be rotatively mounted upon a transverse member of the frame, as 23 or 24, and to be secured in a position of desired adjustment in any desired way, as by the thrust member 50 previously described. Pivotally mounted in such support is an inclined gliding plate 240, formed with a plane under surface, sharp edges, and thickened on the rear face for stiffness. This plate is pivoted at 241, in such manner that the centers of thrust and of resistance are behind the pivot, so that if free the plate would set itself in a position directly parallel with the plane of movement of the craft. The rotary movement of the plate about the pivot 241 is limited by suitable stops, as, for instance, the upper and lower ends of a slot 242, formed in the support and engaged by pin 243 projecting thereinto. This slot may be of such length as to permit movement of the plate from a position parallel to the plane of movement of the craft, where it has no lifting effect, to a position of maximum inclination and maximum lifting effect. The plate thus hung is spring pressed into an inclined position against the thrust and resistance of the water by any suitable mechanism, the result being that at the lowest speeds the plate will assume its position of greatest inclination, and at the higher speeds it will become less and less inclined, so that as lifting efficiency tends to increase with increase of speed, the deflecting angle will decrease so that the resulting lifting effect will tend to remain practically constant or at least will be only slightly increased. One means for effecting this purpose is shown in the drawing, and consists of a thrust member 244, preferably in the rear of and directly in line with the support 239, so as to offer no additional obstruction to passage through the water. It extends upwardly, preferably to a point above the level of the water, where is located means for applying suitably regulated, downward pressure thereupon. The means shown consists of a spring 245, confined between an adjustable nut 246, screw threaded upon thrust member 244, and a fixed abutment 247. The member 247 may be a guide bolted to the support 239 and encircling the member 244.

The pivotal point 241 is preferably in the plane of the lower surface of the plate, and is preferably located at a point intermediate between the forward and rear edges thereof, so that the thrust of the water upon the under side of the plate will be partially counterbalanced, thereby decreasing the amount of work to be done by the spring 245. Any number of gliding plates may be mounted in this way. They may also be used in combination with fixed gliding surfaces. In the particular arrangement shown in said figure, the spring pressed, automatically feathering plate is combined with a normally submerged fixed plate adapted to furnish the main support of the craft. When thus arranged the plate 240 will furnish just the amount of additional supplemental support needed, the arrangement being such that it will adjust itself to this, and throughout a comparatively wide range of speeds.

In Fig. 15 I have shown an arrangement adapted for ready adjustment of the compression of spring 245, by means of a gear and shaft which may connect with any desired automatic or manually operated adjusting mechanism. In said figure the guide 257 had slidably mounted thereon screw threaded sleeves 258, adapted to be screwed up and down by means of the screw 259, operated by bevel gear 260, meshing with gear 261. These two gears are held by suitable frame 262, and the adjustment of spring 245 is effected by rotating the shaft 263.

Returning to Fig. 14, there are there illustrated two other arrangements of feathering plates. The uppermost is like the plate 240, previously described. It is pivotally mounted at 241 and has a pin 243 playing in slot 242. Instead of being counterbalanced by thrust member, it is counterbalanced by a tension member 264, attached to the forward end thereof at 265. This tension member extends upward through groove 264ª and connects with rod 266, encircled by spring 267, supported by an abutment 268, and held under compression by an adjustable thumb nut 269.

The plate 270 in said Fig. 14 is partly fixed and partly feathering. The forward portion 271 is stiff and unyielding transversely, and is rigidly secured to the support 239, as shown in 272. The rear portion 273 in said plate is entirely free from support at the edge 8, and is thinned rearwardly as shown. This thin portion is formed of elastic steel, so that it will yield to the upward thrust of the water, thus decreasing its deflecting angle to a predetermined extent, thereby decreasing the supporting effect of said rearward portion 273, without materially changing the supporting effect of the forward portion 271.

In Fig. 16 I have shown what might be termed a "floating" supplemental supporting plate 280, which is free to move fore and aft within certain limits, and thereby set itself at a natural angle determined by the conditions of operation. Such a plate may be mounted in many ways, one method being that shown in the drawing, wherein it is supported on rigid links in such manner that rearward displacement of the plate will serve to tilt the same to a higher angle, so that the more the plate is displaced rearwardly the greater will be its lifting effect for a given speed. There are many linkages that will accomplish this purpose, but in the form shown as an example 281 and 282 are links of the same length, pivoted to the main support plate 283 at 284 and 285 respectively. In this arrangement the pivots 284 and 285 are nearer each other than are the pivots 286 and 287, and it results from such arrangement that upon any movement rearwardly from the position shown in the drawings, the pivot 287 will travel along an arc of the circle, which will carry it downward, where as rearward movement will carry pivot 286 upwardly around the arc of the circle. Further movement beyond the point where the arc of the circle begins to drop, will give only a slight drop, considerably less than that of the pivot 287.

It is obvious that the distance between the pivots 284 and 285 might be increased, without altering this essential relation. Similarly, the distance between the pivot 286 and 287 might be decreased somewhat without altering this relation. The lengths of the links 281, 282, both absolute and relative to each other, are capable of some variation, without changing the results referred to. If desired, a forward stop may be provided in the form of a pin 288, projecting in the path of the link. Also a rearward stop consisting of a similar pin 289 may be provided. With such means for limiting the range of play permissible on the plate 280, the range of linkage capable of giving the required movement is greatly increased. This is because there are many linkages which will carry the plate in the manner described for a certain selected range of movement, which do not give the same characteristic resultant throughout wider ranges of movement.

If desired, the stops 288 and 289 may be so located as to select a different range of play of the plate 280, about pivots 284 and 285. For instance, the stop 288 may be removed and may be placed forward of link 282, so that the plate 280 may be free to feather or set itself horizontal under certain conditions, as, for instance, where the boat is moving astern. By the above expedient the boat is adapted to travel at slow speed in this direction with the hull as a flotation means and free from submerging tendency of the gliding plates.

In Fig. 17, I have shown another mounting for a gliding plate, namely a pivot 341, which is located below the plate a desired distance so that the entire head resistance of the plate as it moves through the water tends to turn the plate rearwardly about the pivot as a center. Hence the plate tends always automatically to present a lifting surface in the direction of movement regardless of whether the movement be forward or backward. Some means for limiting this automatic tendency should be employed because the plate thus mounted has a tendency to increase its lifting inclination with increase of speed. For this purpose I may arrange stops for limiting the movement such as 342 and 353. The stop 342 will limit the maximum inclination when the boat is moving to the left while the stop 353 will limit the reverse movement of the plate when the boat is moving to the right. In the drawing, I have elected to show the stop 353 located so that the plate will come only to the horizontal position when the motor is reversed and the boat moves toward the right. It is evident, however, that this stop may be arranged as far below the horizontal position of the plate as the stop 342 is above it. In this case the lifting inclination will be the same when the boat is reversed and moves toward the right as it is when the boat is going forward, to the left. If desired, I may also use as a substitute for or supplement to either one of said stops, a tension member connecting with a spring, after the manner of member 264, Fig. 14, may be secured to the rear end of the plate, as indicated by the diagrammatic arrow 354. In such case the stop 353 may be arranged to prevent the plate moving to a position farther than horizontal when the boat is at rest or is reversed.

All of the above described adjustable gliding plates have their advantages for use in particular connections, and any one or all of the gliding plates shown in Figs. 2 and 6 of the drawings may be adjustable plates of any one of the types shown in Figs. 8 to 17 inclusive, and I may make all of the plates of any one of said types, or I may combine selected plates of the various types in any arrangement found desirable.

I claim—

1. In a craft of the class described, a normally submerged deflecting plate pivotally mounted to turn about an axis forward of the center of reaction, in combination with means tending to maintain said plate at a suitable deflecting angle.

2. In a craft of the class described, a normally submerged deflecting plate pivotally mounted to turn about an axis forward of its center of reaction, in combination with a spring tending to maintain said plate at a suitable deflecting angle.

3. In a craft of the class described, a normally submerged deflecting plate pivotally mounted to turn about an axis forward of its center of reaction, in combination with an adjustable spring tending to maintain said plate at a suitable deflecting angle.

4. In a craft of the class described, a normally submerged deflecting plate pivotally mounted to turn about an axis, located substantially in the plane of its deflecting surface, forward of the center of reaction, in combination with means tending to maintain said plate at a suitable deflecting angle.

5. In a craft of the class described, a normally submerged deflecting plate pivotally mounted to turn about an axis, located substantially in the plane of its deflecting surface, forward of its center of reaction, in combination with a spring tending to maintain said plate at a suitable deflecting angle.

6. In a craft of the class described, a normally submerged deflecting plate pivotally mounted to turn about an axis, located substantially in the plane of its deflecting surface, forward of its center of reaction, in combination with an adjustable spring tending to maintain said plate at a suitable deflecting angle.

7. In a craft of the class described, a deflecting plate constructed and arranged for automatic self-adjustment through a certain range of lifting inclinations, in combination with means for adjusting or predetermining the normal angular relation of such range of adjustment with respect to the direction of movement of the craft.

8. In a craft of the class described, a support, a deflecting plate mounted for automatic self-adjustment at various angles to said support, in combination with means for adjusting or predetermining the angle of said support to the direction of movement of the craft.

Signed at New York city in the county of New York, and State of New York, this 15th day of December, A. D. 1913.

PETER COOPER HEWITT.

Witnesses:
R. A. HEWITT,
C. W. FAIRBANK.